March 23, 1971     B. BILDAT     3,572,176
SYSTEM FOR GEAR-SHIFTING IN MOTOR VEHICLES
Filed Dec. 5, 1968     10 Sheets-Sheet 5

INVENTOR.
B. BILDAT

BY Holman, Glascock,
Downing & Seebold
ATTORNEYS.

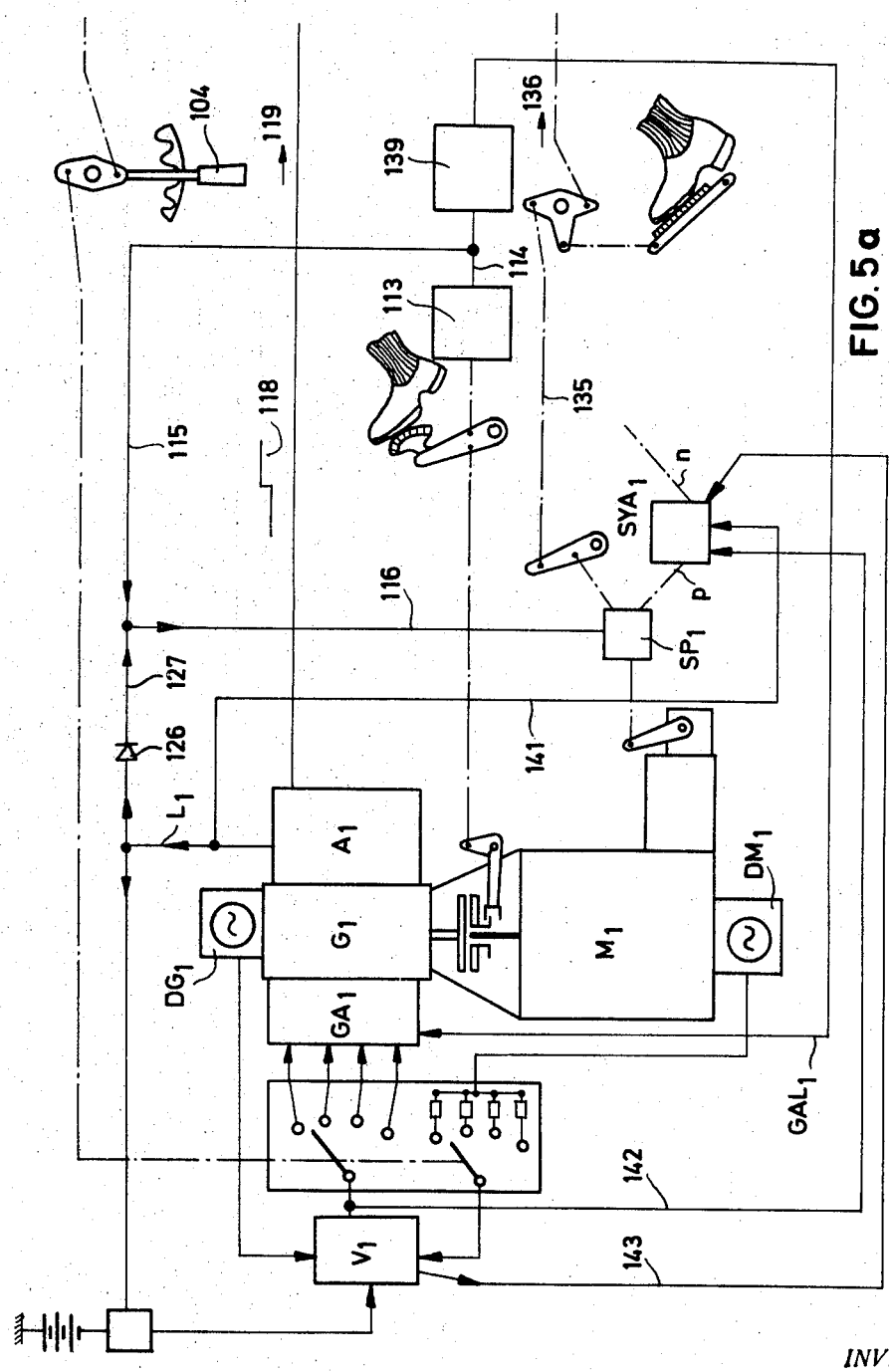

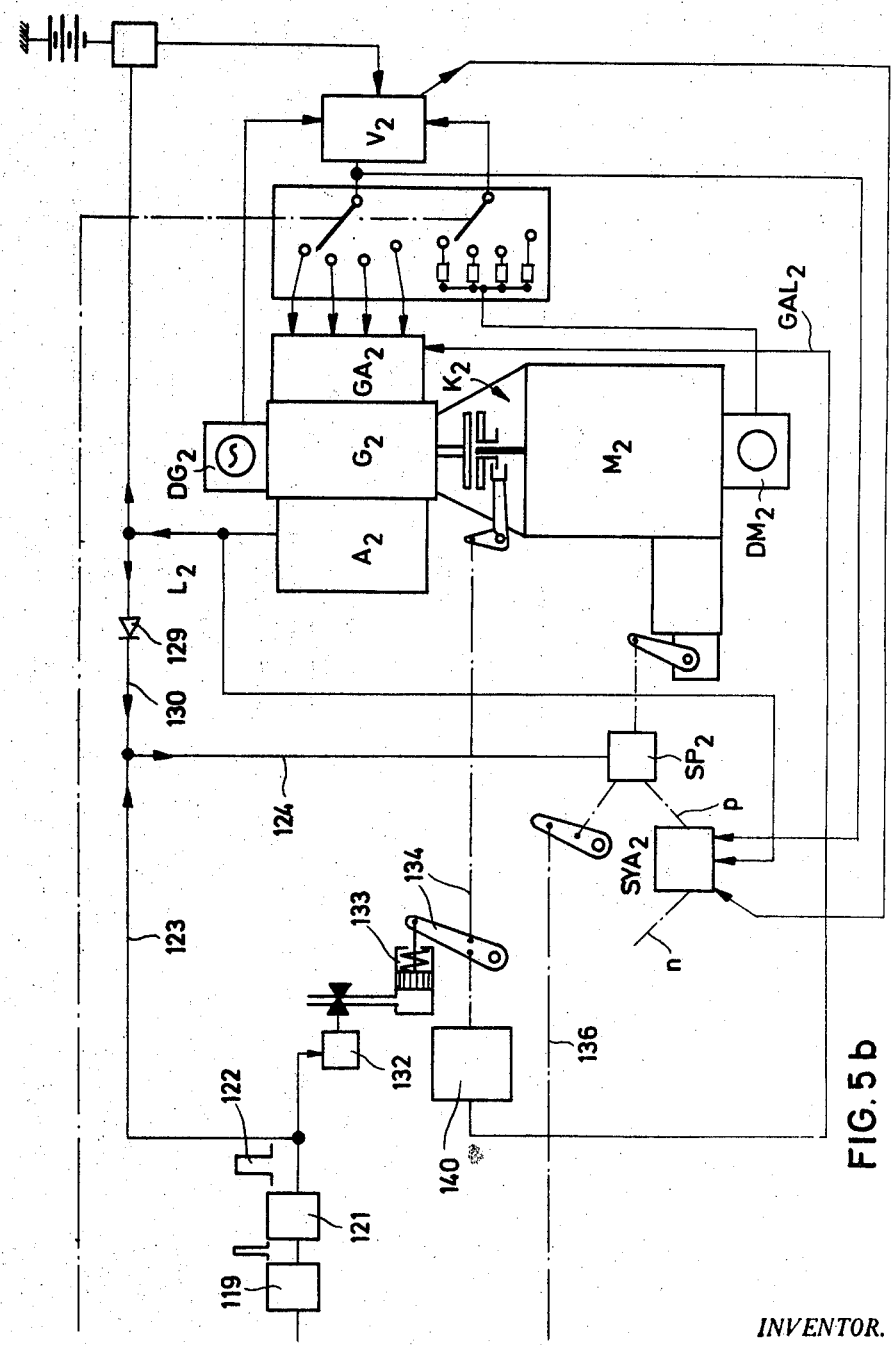

INVENTOR.
B. BILDAT

United States Patent Office 3,572,176
Patented Mar. 23, 1971

3,572,176
SYSTEM FOR GEAR-SHIFTING IN
MOTOR VEHICLES
Benno Bildat, Obere Karlstr. 3, Erlangen, Germany
Filed Dec. 5, 1968, Ser. No. 781,393
Claims priority, application Germany, Dec. 7, 1967,
P 16 55 194.3; Dec. 22, 1967, P 16 55 195.4
Int. Cl. B60k 21/00; F16d 25/00, 67/06
U.S. Cl. 74—847
28 Claims

ABSTRACT OF THE DISCLOSURE

The changing of gears in either manual or automatic transmissions for motor vehicles in which the wheels or wheel groups thereof and at least two engine transmission units are separately connected, with the engines being jointly controllable by the vehicle driver as regards the fuel supply, and the arrangement being such that the flow of force between at least one of the engines and one or more associated wheels is maintained without the employment of expensive and space requiring components.

BACKGROUND OF THE INVENTION

The invention relates to means for the shifting of the change gears of transmissions for motor vehicles in which at least two engine-transmission units for the wheels or wheel groups are connected separately, with the engines thereof being jointly controllable by the driver with respect to the fuel supply.

For heavy motor vehicles, and in particular hauling vehicles for heavy or bulky loads, or for cross-country vehicles, it is often desirable to divide the drive unit into two or more separate engine-transmission units whereby it is possible to maintain a reserve, since under normal circumstances, only one or more of the engine-transmission units is in operation, while the other engine-transmission units are activated solely when the power requirement increases. Moreover, smaller engine transmission units are cheaper to manufacture than operationally comparable engine transmission units possessing a double power.

In motor vehicles having a manually operable transmission as well as vehicles with an automatic transmission a difficulty arises, as is known, in that during shifting there develops an interruption of the transmission of force between the driving engines, on the one hand, and the driven wheels, on the other. In the case of large engine transmission units, the gear shifting requires a relatively long time, and the interruption of the transmission of force occurring during this time in the known vehicles of the type under consideration results, at great variations of the driving resistance, in correspondingly great variations of the vehicle speed, independently of the operational condition of the vehicle engine or engines. This, in turn, with respect to both automatically and manually shiftable engine transmission units, results in load impacts when re-engaging the clutch, which are very strong particularly in the case of the heavy motor vehicles in issue. In addition, the variation of the vehicle speed originating from the interruption of the transmission of force may lead to a situation in which the previously selected gear, now to be engaged, of the respective change gear no longer corresponds to the driving condition of the vehicle prevailing at that time. It may then develop that when the connection between the driven wheels and the individual motor vehicle engines is restored, the latter must be operated at a very unfavorable speed range.

Heretofore, attemps have been made to remedy these difficulties by the insertion of hydraulic converters, but in this situation, the lower efficiency of the hydraulic drives as compared with mechanical drives, must be accepted. Furthermore, hydraulic converters require considerable space and are quite expensive and the maintenance of the transmission of force over a wide power range is possible only in a limited degree with such converters.

The problem to be solved by the present invention is to effect a gear change in the individual variable speed gears in motor vehicles having either a manual or automatic transmission in which at least two engine transmission units for the wheels or wheel groups are connected separately, with the engines thereof being jointly controllable by the driver with respect to the fuel supply in such a way that the transmission of force between at least one of the driving engines and one or more correlated wheels is maintained, without the necessity of employing costly and expensive devices requiring substantial space.

SUMMARY OF THE INVENTION

This problem is solved according to the invention by providing each engine transmission unit with a gearshift device having a number of control inputs corresponding to the number of engageable gears, a release device, by means of which a signal exciting the correlated gearshift device in the sense of a change can be produced, preparation means between the operably connected release devices and the corresponding gearshift devices whereby, for the determination of the particular gear to be engaged, a connection can be established between the respective release device and the respective control input of the gearshift device, and the release devices associated with the individual engine transmission units being so adapted to each other in their mode of operation that the excitation of mutually corresponding control inputs of the individual gearshift devices is effected in a staggered relationship respecting time.

If motor vehicles equipped with several engine transmission units and an automatic gearshift are involved, the desired solution is achieved, according to an advantageous embodiment of the invention, in that one part of the preparation means associated with each engine transmission unit and one corresponding release device constitute a signal transmitter related to the corresponding engine transmission unit, with such signal transmitter picking up electric voltages produced by synchros and proportional, on the one hand, to the vehicle speed and, on the other to the particular engine speed thereby producing, by a correlated linkage circuit, gearshift control signals corresponding to a certain engine speed and a certain vehicle speed, with the latter signals being supplied to a corresponding control input of the particular gearshift device, and adjusting elements of the linkage circuit of one of the signal transmitters being designed in relation to corresponding adjusting elements of the linkage circuit or circuits of the other signal transmitter or transmitters so that different value pairs of the particular engine speed, and of the vehicle speed respectively are related to mutually corresponding gearshift control signals of the signal transmitters for releasing the shifting of corresponding gears at the respective transmissions.

This coordination of different value pairs of the engine speed and the vehicle speed, or respectively, the transmission output speed corresponding to the same, means that the change of gear is achieved in one engine transmission unit with a slight time shift as respects the corresponding change of gear in another engine transmission unit.

A special advantage of the present shifting arrangement is that the measures for achieving a mutual time displacement of the shifting periods in the individual transmissions do not involve an intervention in these transmissions, such as for example a variation of their transmission ratios, but that the problem underlying the invention is solved exclusively by measures within the control circuit so that a particularly economical solution is the ultimate result.

The invention is also particularly efficacious for motor vehicles of the type in which the individual gearshift devices are controlled manually by the driver with respect to the speed selection to be made. Such an arrangement includes a driver-operated gear selector defining the preparation means and governing the engine transmission units jointly, and synchronizing and switching devices preparable, by means of this gear selector, for the execution of the particular gear change and releasable by command pulses successively, with said devices constituting the gearshift device, wherein a synchronizing and switching device serving as a guide unit is connected with a driver-operated pulse transmitter associated with the correlated release device which supplies pulses triggering the change of gear in a corresponding preceding engine transmission unit, while the other synchronizing and switching device operative in a certain sequence as succeeding units likewise present pulse transmitters associated with corresponding release devices which supply command pulses for the time staggered execution of the change of gear in the engine transmission units following the preceding engine transmission unit and following one another, whenever the same have received via release lines, from an indicating device operably related to the preceding engine transmission unit, a release signal which reports the completion of the desired change of gear in the particular preceding engine transmission unit.

While, in the embodiment of the invention described above for engine transmission units provided with an automatic gearshift, the adjusting elements of the linkage circuits are so adjusted that by proper time-staggering of the development of mutually corresponding gearshift command signals, an overlapping of the interruption of the transmission of force with respect to the individual engine transmission units is reliably avoided, with such overlapping of the interruption times being positively avoided since the change of gear in one engine transmission unit can start only after the change of gear in the preceding engine transmission unit is completed.

According to another advantageous embodiment of the invention, the individual gearshift devices of the various engine transmission units comprise comparing devices, defined for example, by differential relays equipped with a center contact, to which electric measurable variables produced by means of synchros, representing the transmission input speed or the transmission output speed respectively and conducted via series-connection elements corresponding to the selectable transmission ratios of the respective transmission and connectable by means of the preparation circuit are furnishable with further gearshift motors being connected with the comparing devices occurring upon the synchronism of the transmission member to be coupled, in the sense of engagement of the selected gear, as well as the engine shaft, and accelerating and decelerating devices respectively for establishing synchronism of the transmission member to be coupled before the engagement of the respective gear. In addition, the individual engine-transmission units have associated therewith, in this situation, blocking devices which are connected via control lines with the corresponding pulse sources in the sense of their release and, which during the duration of the idling position, effect in the correlated transmissions a separation of the fuel supply control mechanism of the respective engines from the gas pedal and establish operative connections of the fuel supply control mechanism with the correlated engine shaft accelerating or decelerating device.

The last mentioned devices permit an automatic synchronization of the transmission members to be coupled in the transmission units after the occurrence of the gearshift command signal associated with the respective engine transmission unit so that a synchronized shifting of mutually corresponding gears in the engine transmission units independently of their staggering in time is required.

Further objects and advantages of the invention will become more fully apparent to persons skilled in the art from the following detailed description and annexed drawings.

BRIEF DESCRIPTION OF THE DRAWINGS

FIGS. 5a and 5b are diagrammatic views to be fitted together of an additional form of construction of the shifting arrangement to illustrate another possibility for the excitation of the gearshift motors;

DETAILED DESCRIPTION OF THE INVENTION

Figure 1:
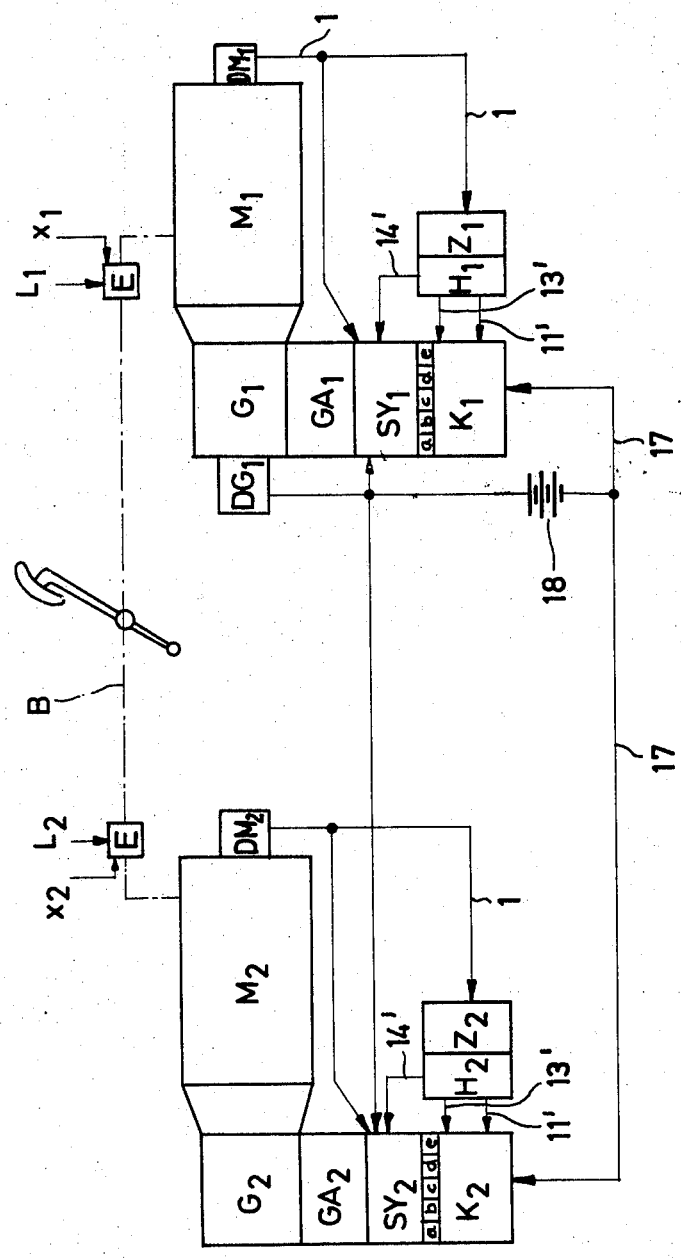
FIG. 1 is a diagrammatic view of a form of construction of the shifting arrangement of the invention to explain the basic idea of the invention.

In FIG. 1 there is illustrated two driving engines M1 and M2 which, via change gears, G1 and G2 cooperate with two different driven axles of a heavy road or cross-country vehicle. A synchro DM1, DM2 coupled with the engine shaft is provided on each of the engines, and effects at its output, a voltage proportional to the engine speed. Further, there is connected to the change gear G1, a synchro DG1 which produces a voltage proportional to the speed of rotation of the output shaft of the transmission and hence to the vehicle speed. Since it can generally be assumed that the speed of rotation of the driven axles of the respective motor vehicle is the same, the voltage of the synchro DG1 also reproduces the speed of rotation at the output shaft of the change gear G2 and accordingly develops a signal voltage common to the two units indicated in FIG. 1 on the right and on the left hand side. The two engine transmission units are associated with a signal transmitter for each, and which comprises the elements designated in FIG. 1 by K1, H1 and Z1 and, K2, H2 and Z2 respectively. The function of these two signal transmitters is to form, from measurable variable representing the vehicle speed, signals which effect the engagement of a specific gear in the change gears G1, G2 upon the occurrence of certain value pairs of the engine speed and the transmission output shaft speed, respectively.

It is obvious that such signal transmitters may be constructed in various ways. In the embodiment herein disclosed there is shown, for example, two components, namely a circuit provided with three stable states which is energized from the synchro DM1, DM2 coupled with the engine and which may be termed a state feeler Z1, Z2 of the operational state of the particular engine. Further, the signal transmitter embodies a linkage circuit K1, K2 controlled by the vehicle speed or the electric voltage representing the latter, and which linkage circuit produces the gearshift command signals $a$, $b$, $c$, $d$ and $e$, assuming that the change gear G1, G2 is equipped with five shiftable gears. The gearshift command signals are transmitted to the gearshift device which, in the arrangement shown in FIG. 1, contains a synchronization circuit SY1, SY2 and a gearshift motor GA1, GA2, as will be more fully discussed later.

Finally, it can also be seen from FIG. 1 that each of the state feelers Z1, Z2 is followed by a circuit member H1, H2 which presents holding circuits which function so that signals reporting a certain engine state are extended beyond the actual operative duration of this state, whereby a stable mode of operation of the entire circuit is achieved, as will be hereinafter explained.

According to the invention, there is achieved, by a suitable design of the circuit elements in the engine state feeler Z1, Z2 and of the circuit elements in the linkage circuits K1, K2 controlled as a function of the driving speed, that at equal engine control, for example, by a common actuation of a fuel supply control mechanism B, the gearshift command signals $a$ to $e$ are supplied, due to the coordination with different value pairs of the engine speed and of the vehicle speed, to one engine transmission unit at a different time than to the other engine transmission unit.

This different adjustment of the circuit elements of the state feelers Z1, Z2 of the engine may be effected in the sense that the response level which corresponds to a command for upward or downward shifting respectively is placed in one state feeler on a level different from that of the other state feeler.

Figure 2:
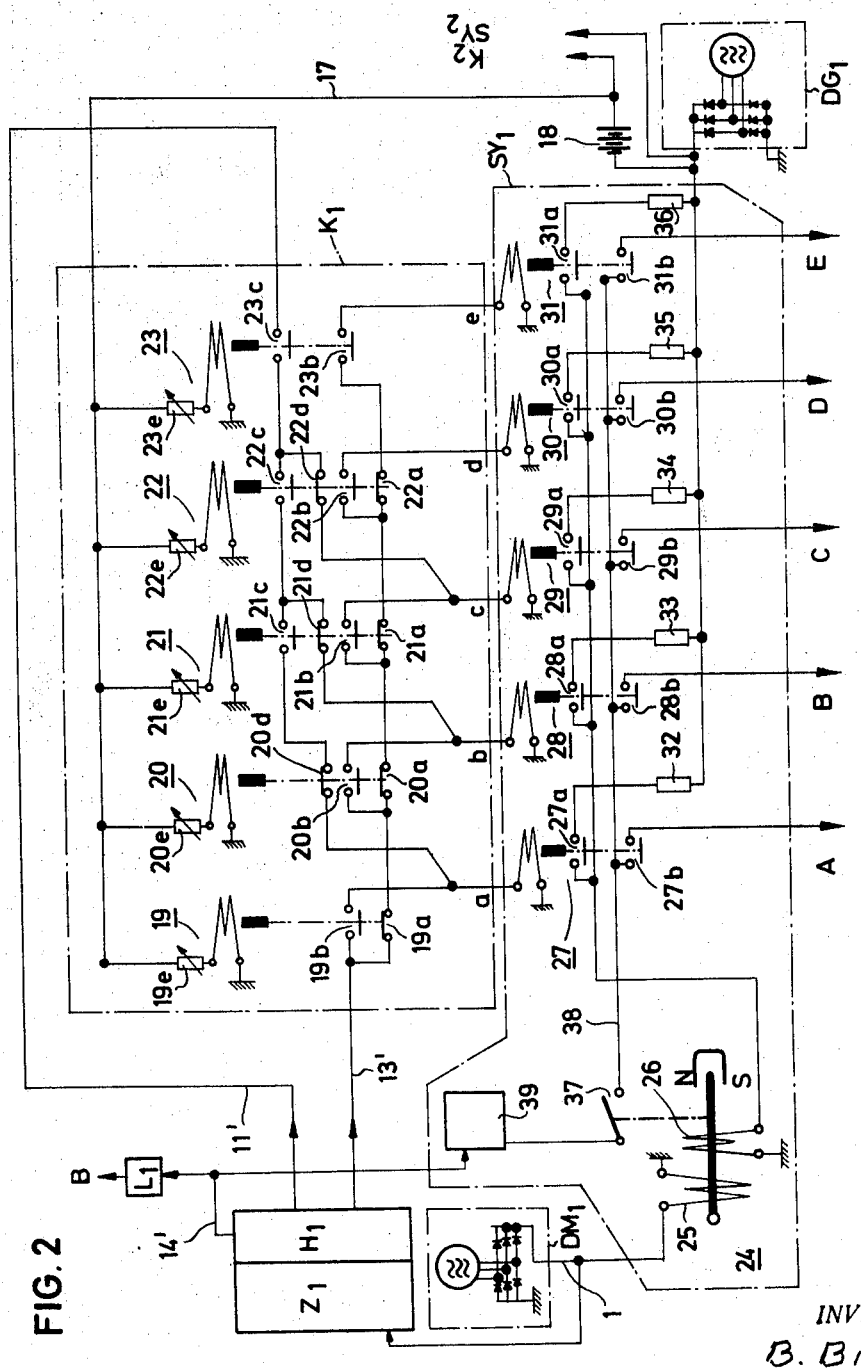
FIG. 2 is a view of a form of construction of the linkage circuit for the production of the gearshift command signals together with a synchronization circuit.
Figure 3:
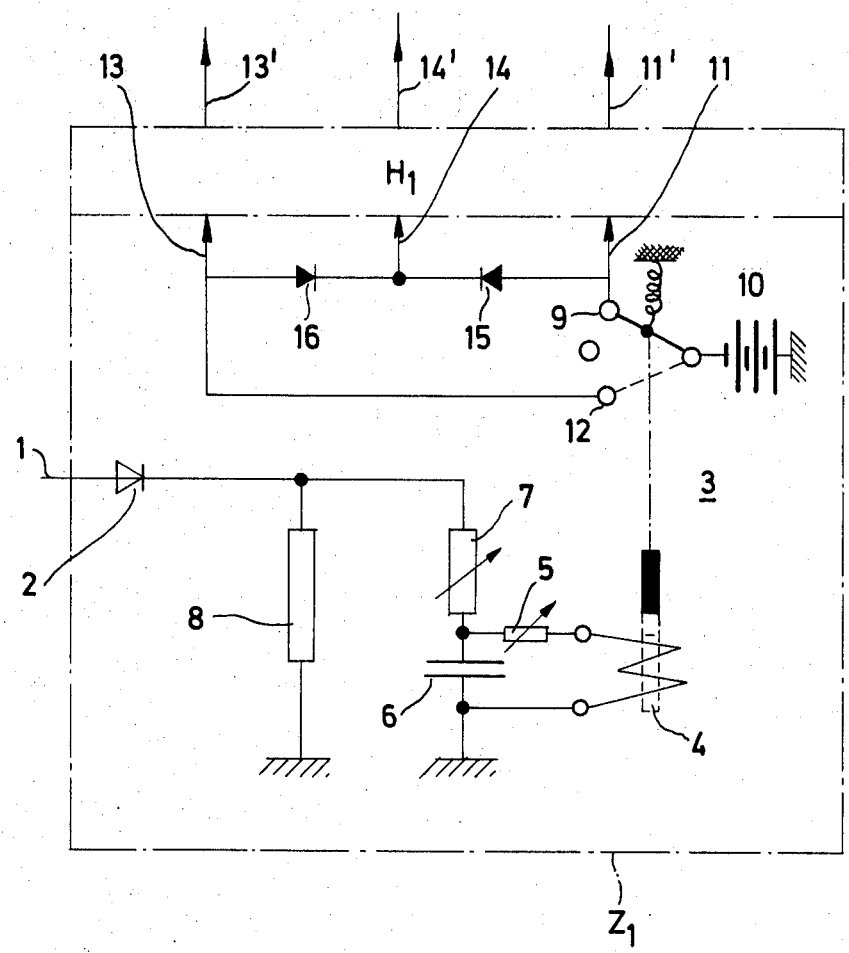
FIG. 3 is a view of a specific form of construction of a circuit with three stable states for the reproduction of the operational state of the particular engine.

The left hand sides of FIGS. 2 and 3 illustrate a form of construction of the circuit components designated in FIG. 1 at DM1, Z1 and H1. The corresponding circuit components of the other engine transmission unit are of identical design, so that it is unnecessary to explain such components specifically. As can be seen in FIG. 2, the synchro DM1 is constituted by a three-phase synchronous generator which, via a three-phase full-wave rectifier circuit, is connected to an output line 1. This output line is connected with the state feeler Z1, as disclosed in FIG. 3, via a rectifier 2, and the rectifier prevents a backflow of charge from the feeler circuit. The latter comprises a relay 3 provided with three switch positions, and whose exciter winding 4 is in series with a setting resistance 5 and in parallel with a condenser 6. The parallel circuit, in turn, is in series with another setting resistance 7, and this series circuit finally is connected to the rectifier 2 in parallel with a discharge resistance 8.

In the event the engine speed is below a certain value, the D.C. voltage of the synchro DM1 applied on line 1 is not sufficient to charge the condenser 6 to a sufficient voltage to switch the relay 3 over from the position shown in FIG. 3, so that a switch contact 9 of the relay remains connected with a voltage source 10 and consequently a voltage signal is applied to line 11. If the engine speed increases so that the line 1 carries a higher D.C. voltage, the condenser 6 gradually charges to the extent that sufficient excitation of the winding 4 of the relay results, which accordingly assumes its middle position in which the voltage source 10 is separated from the switch contacts of the relay connected with the signal lines. A further increase of the D.C. voltage of the line 1 due to a correspondingly higher engine speed finally leads to a switching of the relay 3 into the position indicated by the broken lines in which the voltage source 10 is connected with switch contact 12 so that a corresponding voltage signal develops on line 13. If the voltage line 1 drops, due to a corresponding decrease of the engine speed, the relay 3 returns first to the middle position and then to the upper position shown in FIG. 3 as the discharge of the condenser 6 across the resistance 7 and 8 progresses.

Hence, the excitation of the relay 3 through the condenser 6 causes a voltage signal to be applied to the lines 11 and 13 only when the corresponding state of the engine operation has existed for a prolonged time and/or differs very strongly from the optimum operational state, which is represented by the nonexistence of voltage signals on the line 11 and line 13. This mode of operation which, of course, can be achieved also with other circuit elements, and effects a shifting of the respective change gear not already triggered when the optimum speed range of the engine is slightly exceeded or not attained.

Lastly, it is also apparent from FIG. 3 that a signal line 14 is connected via rectifiers 15 and 16 with the signal lines 11 and 13 so that from the line 14 a signal can be tapped which corresponds to an OR linkage of the signals of lines 11 and 13.

The circuit component H1 embodies holding relays related to the signal lines 11, 13 and 14 with an adjustably delayed tripping time, which is so selected that the signals possibly occurring only briefly on the lines 11, 13 and 14 appear prolonged to a duration which is at least somewhat longer than the duration of a shifting operation in the respective change gear.

FIG. 2 illustrates the design of the signal transmitters defined by the state feelers and the linkage circuits, and in particular a design of the vehicle-speed-dependent linkage circuit, which is in the form of a relay chain.

The linkage circuit K1, identical as regards its circuitry to the linkage circuit K2, receives via a line 17 a starting voltage derived from a series connection of the synchro DG 1 with a voltage source 18, which voltage is so rated that the highest voltage is associated with the vehicle stationary or at a standstill and zero voltage with the maximum speed of the vehicle. A number of relays 19, 20, 21, 22 and 23 corresponding to the number of shiftable gears of the change gear are connected to the line 17, with the exciter windings thereof being coupled with the line 17 through setting resistances $19e$ to $23e$. The setting resistances are so adjusted that the relays 19 to 23 trip, upon reduction of the voltage on the line 17, due to an increase of the vehicle speed successively at those speeds of rotation of the output side of the transmission, or at that vehicle speed, which upon engagement of the gear correlated with the respective relay, produces an engine speed just exceeding the particular optimum engine speed respectively. The relays 19 to 23 are provided with contact sets which are connected with signal lines 11′, 13′ of the engine state feeler Z1.

The relays 19 to 22 include rest contacts $19a$ to $22a$ connected in series with one another, and connected to the signal line 13′. Further, the relays 19 to 23 embody contacts $19b$ to $23b$ which are connected, on the one hand, with the output lines $a$, $b$, $c$, $d$, $e$ of the linkage circuit and, on the other, with the contact, away from the signal line 13′, of the rest contacts $19a$ to $22a$ of the preceding relay 19, 20, 21 or 22. The work contacts $19b$ of the relay 19 are connected directly to the line 13 on the side away from the output line $a$.

Referring now to FIGS. 2 and 3, it will be readily seen that at an engine speed above the optimum operational state and consequently upon the occurrence of a voltage signal on the line 13′, a signal is presented at that one of the outputs $a$ to $e$ of the linkage circuit which triggers a change of gear to the next higher gear.

The part of the linkage circuit serving to produce gearshift command signals in the sense of a change to the lower gears may be constituted, proceeding from relay 23 associated with the highest gear, similarly to the part of the linkage circuit just described.

According to a special aspect of the invention, this second part of the linkage circuit is designed in such a manner that there is taken into account the fact that the shifting operation takes relatively long in heavy vehicles provided with dual engines and often the vehicle state or the driving situation changes so rapidly, respectively, for instance, after and immediately preceding upward shifting, that the engagement of the next lower gear of the respective transmission of the two engine transmission units does not by any means result in a restoration of the optimum operational state of the engine.

Accordingly, a voltage signal presented on the line 11' which corresponds to an engine speed below the optimum operational state of the engine, and which requires a gearshifting operation in the sense of a downward shift, is conducted, not to the output of the linkage circuit associated with the next lower gear, but to the second next output, skipping the next. FIG. 2 illustrates the manner in which the wiring of additional contact sets of the relays is effected for this purpose.

The relays 21, 22 and 23 are provided with work contacts 21c, 22c and 23c, while the relays 20, 21 and 22 have rest contacts 20d, 21d and 22d. In the present example provided with five shiftable gears, the outputs of the linkage circuit associated with the three lowest gears are connected with the signal line 11' over the rest contact of the relay of the next higher order as well as over the series connection of the work contacts of the thereafter following relays. A signal presented on the line 14' serves for the excitation of that part of the gearshift device which effects the disengagement of the previously engaged gear. This is indicated in FIGS. 1 and 2 by a block symbol denoted $L_1$, $L_2$. If the gearshift motor involves a differential piston drive which, when compressed air is supplied, moves into a middle position corresponding to the transmission idling position, the signal of the line 14' can be used to open a pressure medium valve for the admission to this shift drive.

As stated above, the construction of the engine state feeler Z2 and the linkage circuit K2 corresponds to the circuit above described. However, the settings of resistances 24 to 28 of the linkage circuit K2 and/or the setting of the resistances 5 and 7 of the state feeler Z2 are selected to be different from the corresponding settings of the above-described circuit components by a small amount such that the gearshifting operation in the change gears G1 and G2 occurs at different times, whereby the desired effect briefly described hereinbefore is achieved.

The outputs a to e of the linkage circuit may be connected directly with the corresponding inputs of the gearshift motors related to the change gears. According to a modification of the invention, however, there is connected between the outputs of the linkage circuit, on the one hand, and the inputs of the particular gearshift motor, on the other, a synchronization circuit SY1, SY2, which causes the engagement of a certain gear, commanded by the signal transmitter or the linkage circuit thereof, respectively, to always occur during the synchronism of the transmission members to be coupled together. Of the synchronization circuits associated with the two units of the dual engine vehicle, only SY1 will be described in detail, since the design of SY2 is identical thereto. This synchronization circuit includes a comparator circuit in which an electric measurable variable corresponding to the particular engine speed is compared with an electric measurable variable corresponding to the particular vehicle speed and whenever the synchronism of the transmission members to be coupled together prevails, a signal is produced. In the present embodiment of the invention, the comparator circuit is defined by a direct-current differential relay 24 whose two control windings 25 and 26, surrounding a polarizing relay armature, are connected to the output line 1 of the synchro DM1 or are connectable with the output line 1 of the synchro DG1 respectively. This connection of the comparator relay 24 with the synchro DG1 is effected via work contacts 27a to 31a of relays 27 to 31 coupled to the outputs a to e of the linkage circuit K1 as well as via series resistances 32 to 36, which are graduated with respect to their resistance value according to the transmission ratio of the gears to be shifted. This graduation of the resistances causes an equally strong excitation of the armature of the relay 24 by the exciter windings 25 and 26 to develop only when the voltages presented by the two synchros DM1 and DG1 are in a ratio to each other which corresponds to the transmission ratio of the respective gear. The circuit operably related to the control winding 26 of the relay 24 and leading over one of the resistances 32 to 36 is then always closed when a gearshift command signal develops at one of the outputs A to E of the linkage circuit K1 and energizes the correlated relay 27 to 31 of the synchronization circuit SY1.

If, therefore, synchronism of the transmission members to be coupled has developed, contact pair 37 of the differential relay 24 is bridged, and at this moment a signal voltage readied in a circuit element 39 is available on a line 38. This signal voltage is supplied over ddtitional work contacts 27b to 31b to that input A or B or C or D or E of the gearshift motor GA1 whose excitation is commanded by a corresponding shift command signal on one of the outputs a to e of the linkage circuit K1.

The readying of the signal voltage to be furnished to the line 38 in the circuit element 39, which may embody a current source and a corresponding relay, occurs as a function of the voltage signal presented on the line 14' in such manner that the synchronization circuit SY1 is connected to the voltage from the circuit element 39 from that moment when, either on line 13' or line 11' and consequently line 14', a signal voltage appears.

Finally, it should also be noted that due to the assumed equality of the speeds of rotation of the driven vehicle axles, the output voltages of the synchro DG1 or the output voltage on line 17 respectively can be used also in the synchronization circuit SY2 or in the linkage circuit K2, respectively, as indicated at the right-hand side of FIG. 2.

The following is a brief description of the mode of operation of the arrangement shown in FIG. 2:

It is assumed that the gear of the change gear G1 correlated with the relay 20, the linkage circuit output b, and relay 28 is engaged, and that the engine is in its optimum operational range. Accordingly, the relay 19 is in the tripped position indicated in FIG. 2, while the relays 20 to 23 are in the attracted position. Further, the relay 3 according to FIG. 3 occupies its middle position so that neither the line 11' nor line 13' carries a signal voltage. If the vehicle speed increases due to a diminishing driving resistance, the relay 20 trips and the relay 3 changes over to a position in which the current source 10 is connected with the contact 12 and consequently a signal voltage is produced on the signal line 13'. This signal voltage is communicated via the series-connected rest contacts 19a and 20a as well as via the still closed work contacts 21b of the relay 21 to the output c of the linkage circuit so that an excitation of the relay 29 is effected. By means of the rectifier 16, the voltage of the line 13 (FIG. 3) is transmitted, moreover, to the line 14 and thence over the holding circuit H1 to line 14', so that from the circuit element $L_1$, by means of the gearshift motor, a setting of the respective change gear to the idling position is produced, and there now develops from the circuit element 39 a voltage loading of the comparator circuit SY1. If the synchronism of the transmission members to be coupled now occurs, which can be achieved, for example, by automatically controlled intermediate gas devices or engine brakes, there develops, due to the insertion of the resistance 34 effected by the relay 29 into the circuit associated with the control winding 26, a like excitation of the armature of the relay 24 and thereby a bridging of the contact 37. The signal voltage then available on the line 38 reaches, via the work contact 29b of the relay 29, the input C of the gearshift motor whereby the corresponding gear can be engaged.

When using the above-mentioned automatically controlled intermediate gas device or engine brake, a fuel supply control mechanism B must be uncoupled from the correlated engine during the time interval at which one of the transmissions is in an idling position. This is accomplished in the manner indicated in FIG. 1 by elements E, formed, for example, by compressed air cylinders, which elements are energized by the above-mentioned circuit elements $L_1$, $L_2$ in the sense of such uncoupling and are de-energized after the completion of the gear change in the correlated transmission in the sense of the restoration of the drive connection between the driver-operated control mechanism and the correlated engine. The latter is indicated in FIG. 1 by control symbols $x1$ and $x2$.

It should be pointed out that, in the described embodiment of the shifting arrangement of the invention, one engine-transmission unit may temporarily be arrested, with the respective engine idling, since the signal lines $14'$, $13'$ and $11'$ are interrupted after the establishment of the transmission idling position by a corresponding excitation of the gearshift motor. This can be effected by means of a manually operated switch which is coupled with a device for interrupting the common fuel supply control mechanism B. If, at a later time, the idling engine is reconnected, it automatically synchronizes again with the unit in operation, while maintaining the particularity of the shifting arrangement according to the invention, namely the gearshifting operations occurring at different times.

For the rest, instead of the electromechanical circuit elements, electronic circuit elements may be used, by employing a flip-flop chain in lieu of the relay chain of the linkage circuit.

Figure 4A:
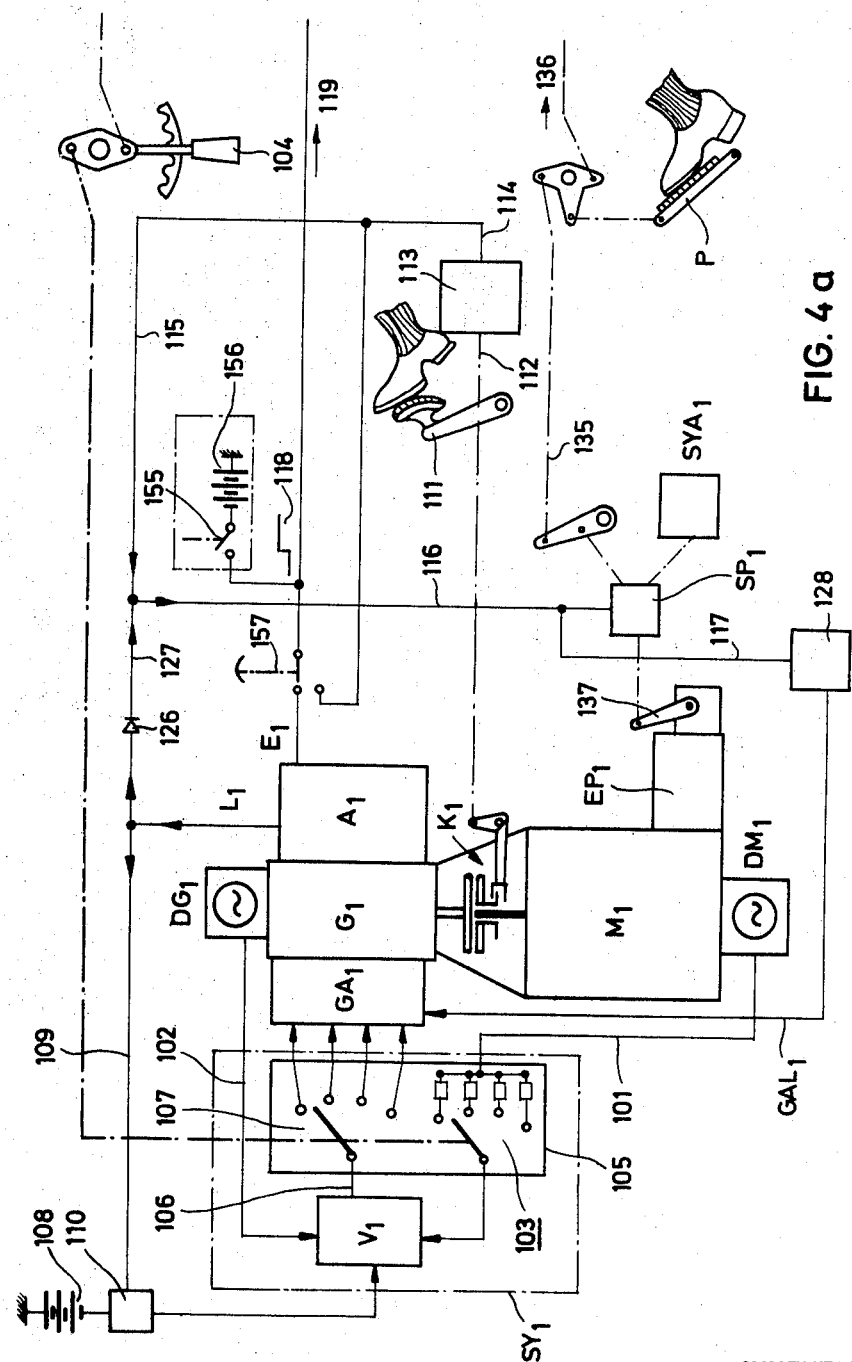
FIGS. 4a and 4b are diagrammatic views to be fitted together of another form of construction of the shifting arrangement for motor vehicles provided with two engine-transmission units.
Figure 4B:
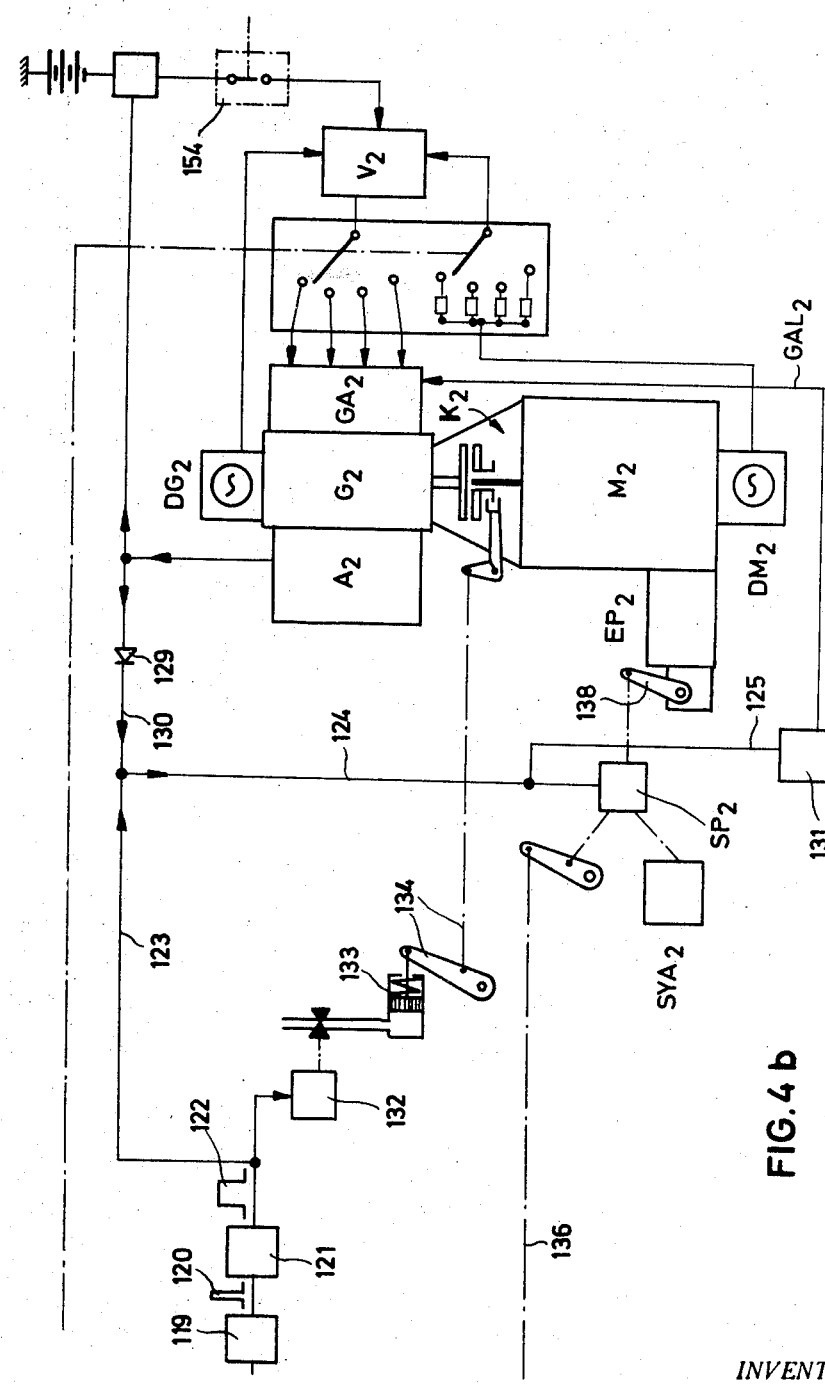

With reference to FIGS. 4a and 4b, it should be mentioned that equivalent parts bear the same reference symbols as in the previously described embodiment. In Pat. No. 3,417,640 in which the applicant was one of the inventors, there is described in detail the synchronization and shifting arrangements. A motor vehicle provided with a shifting arrangement includes, for example, two driving engines M1 and M2, with which corresponding change gears G1, G2 are connected via coupling devices K1, K2. Assuming the driven shafts of the change gears G1, G2 are coupled with different wheel sets of the respective motor vehicle, the gear change in the change gears G1 and G2 is effected by gearshift motors GA1, GA2, which are under the control of synchronizing and switching devices (to be later described) provided separately for each engine-transmission unit.

One of the synchronizing and switching devices will be described in connection with engine-transmission unit M1, G1. A synchro DM1 is coupled with the shaft of engine M1 and the synchro represents the speed of rotation of this engine in the form of an electric voltage, and a synchro DG1 is coupled with the drive shaft of transmission G1. The synchro DG1 represents the transmission output speed in the form of an electric voltage. The synchros may be defined by multi-phase alternating current generators whose outputs are transmitted over rectifier circuits so that on lines designated 101 and 102 there occur D.C. voltages corresponding to the transmission input speed or the transmission output speed, respectively. The voltages applied to lines 101 and 102 are transmitted to a comparing device V1. However, there is provided in the train of the line 101 an arrangement of series resistances 103 which are insetable into the line 101 at will by a selector lever 104 actuated by the driver and a selector and distributor switch 105 connected therewith according to a desired transmission ratio. By a proper graduation of the resistance values of the resistance arrangement 103 equal voltages are available at the inputs of the comparing device V1 connected with the lines 101 and 102 whenever synchronism of the transmission members to be coupled prevails in the transmission G1.

When this equality of voltage of the inputs of the comparing device is established, the latter furnishes a releasing signal at its output 106. By means of a distributor switch 107 positively coupled with the selector lever 104, the releasing signal can be transmitted to a specific input of the gearshift motor GA1 and there effect the shifting command desired by the driver and prepared by a corresponding setting of the selector lever 104.

The comparing device V1 may be constituted, for example, by a differential relay provided with two exciter windings and a central contact bridged at equal excitation of these windings, with the central contact being fed with a signal voltage from a voltage source 108 only when a holding circuit 110 has been excited via a line 109, whose holding time determines the duration of the feeding of the comparing device V1 with the voltage of the energy source 108.

The change gear G1 or the gearshift motor GA1 respectively has connected therewith an indicating device A1 which reproduces the particular state of the change gear by electric signals imposed on the output lines L1, E1. The indicating device A1 will be later described in greater detail with reference to FIG. 10. However, it should be set forth that the output line L1 carries a signal voltage whenever the change gear G1 is in the idling position, and the output line E1 a signal voltage whenever one of the gears of the change gear is engaged.

Finally, there is provided an input control line GAL1 which, in the manner illustrated, leads to the gearshift motor GA1 and upon excitation produces an actuation of the gearshift motor for establishing the idling condition of the change gear G1.

The other engine-transmission unit of the respective vehicle, disclosed in FIG. 4b, is structurally the same as the previously described part of the first engine-transmission unit, and hence the above description of the circuit connections between the parts identified by index 1 of the arrangement in FIG. 4a apply similarly to the connection and circuitry of the parts denoted by index 2. Only the following differences should be mentioned:

In the admission line feeding the comparing device V2 with a signal voltage a switch is located, and the function thereof will be later explained. Moreover, at the indicating device A2, a signal output supplying an output signal upon the engagement of a gear is not provided or such a signal output is not employed.

In the following description the mode of operation of the two engine-transmission units M1, G1 and M2, G2, respectively, as well as the correlated synchronizing and switching means will be briefly explained to the extent that such arrangements are common to both of these units When the driver desires to execute a gear change in both change gears G1, G2, the driver prepares such action by a corresponding setting of the selector lever 104 whereby, on the one hand, the output of the particular comparing device is connected with an input of the corresponding gearshift motor associated with the selected gear and, on the other hand, a certain series-connection element is connected between the synchro associated with the respective motor and the comparing device. Hence, the synchronizing and switching means of both engine-transmission units is prepared for the execution of a shifting command. The release of the respective shifting operation then occurs by way of a control signal supplied to the gearshift motors GA1, GA2 via the input control lines GAL1, GAL2, but it is of great importance that the formation of such control signal and the time of the appearance thereof on the particular input control line is different in the two units shown in FIGS. 4a and 4b.

When the signal has reached the correlated gearshift motor, the latter moves the change gear associated therewith into the idling position, and possibly with a brief disengagement of a clutch. At this moment a signal voltage develops on lines 11, 12 which causes an excitation of the holding circuit located in the train of the feed line of the comparing device so that a feed voltage is now available at the comparing devices V1, V2. If synchronism of the transmission members of the change gear G1, G2 to be coupled occurs, and this can be achieved by means of automatic synchronization control circuits indicated at SYA1, SYA2, and acting, for example, on the respective fuel supply control mechanism, the signal voltage available at the comparing device is transmitted as a control signal to the input of the correlated gearshift motor selected by the selector lever 104 and excites the same in the sense of the engagement of the selected gear.

However, as has been previously stated, the shifting operation above-described does not take place simultaneously in the two engine-transmission units. Such operation occurs firstly in the arrangement indicated in FIG. 4a and only then in the arrangement of FIG. 4b. This will be later more fully discussed.

The gearshifting operation in the engine-transmission unit M1 and G1 is triggered by the driver by a brief actuation of a clutch pedal 111 following the setting of the selector lever 104 by the driver. The clutch pedal 111 is connected through a linkage 112 with a pulse transmitter 113 which, at its output 114, produces a voltage pulse of a duration sufficient to reliably energize lines 115, 116, 117 and GAL1 for establishing the transmission idling position, whereupon the above-described shifting operation proceeds in the engine-transmission unit M1, G1. When the engagement of the selected gear in the change gear G1 has taken place, the indicator A1 furnishes a signal voltage at its output E1 and the course thereof is indicated diagrammatically at 118. This signal voltage serves for the actuation of a short-time pulse transmitter 119, which may be constituted by a so-called wiper relay, a pulse relay, or a corresponding electronic circuit component, and which provides, at its output, a brief pulse denoted 120. This pulse, in turn, serves to energize a holding circuit 121 so there is formed, by the pulse transmitter 119 in connection with the holding circuit 121, a signal pulse 122 whose front substantially coincides in time with the engagement of the selected gear in the change gear G1 and whose duration is again sufficient to energize reliably the gearshift motor GA2 via lines 123, 124 and GAL2 for establishing the idling position in the change gear G2. Thereupon, the above-described shifting operation occurs in the engine-transmission unit M2, G2.

If the gearshift motor is defined by a differential piston drive in which the idling position is effected during the duration of the gearshifting operation by allowing admission with a pressure medium with the engagement of a selected gear developed by a venting of a piston side associated with the selected gear while maintaining the admission with the pressure medium of the gearshift motor as a whole, and attention is directed to Pat. No. 2,952,346 particularly FIG. 4, a control signal must also be supplied via the correlated input control line GAL1, GAL2 at least during the duration of the shifting operation, but preferably for a somewhat longer time. To achieve this end, a connecting line 127 including a valve 126 is provided between the output L1 of the indicating device A1 and the line 116 so that a signal voltage is also sent to line 117 when the pulse time of the pulse transmitter 113 is already terminated. For the maintenance of the admission with the pressure medium of the gearshift motor GA1, even when the output L1 of the indicating device A1 no longer supplies a signal voltage to the lines 116 and 117 due to the engagement of a gear, an additional holding circuit 128 is connected between the line 117 and the input control line GAL1, for maintaining the excitation of the gearshift motor GA1 for a short time following the termination of the idling condition of the change gear G1.

A corresponding arrangement is shown in FIG. 4b, in which there is provided a valve 129, a connecting line 130, and a holding circuit 131.

As illustrated in FIG. 4b, the signal pulse 122 of the pulse transmitter 119, 121 is used also for controlling, via the setting drive 132, the admission of the pressure medium to a work cylinder 133 which effects, upon the occurrence of the pulse 122 through an actuating linkage 134, a brief disengagement of the clutch K2 between the driving engine M2 and the change gear G2 whereby the displacement of the change gear to the idling position, likewise produced at this moment via the lines 123, 124, 125 and GAL2, is facilitated.

The control of the fuel supply to the vehicle driving engines originates from a gas pedal P, which pedal is connected by actuating linkages 135, 136 associated with the individual driving engines to an arrangement for the control of an injection pump EP1, EP2. As shown in FIGS. 4a and 4b, there acts upon a setting lever 137, 138 of the injection pump EP1, EP2, the actuating linkage 135, 136 effected by the driver simultaneously with respect to all engine-transmission units and the synchronization control devices SYA1, SYA2, respectively, at different times regarding the two engine-transmission units. During normal driving, the actuating linkage 135, 136 is coupled with the correlated injection pump EP1, EP2, while the synchronization control devices SYA1, SYA2 are connected with the injection pump EP1, EP2 when the correlated change gear is in the idling position. At this time, according to an essential feature of the invention, the operative connection between the actuating linkage 135, 136 and the correlated fuel supply control mechanism is interrupted. To achieve this result, blocking devices SP1, SP2 are provided, and these devices, during the duration of the idling condition, in the respective transmissions, effect a separation of the fuel supply control mechanism of the respective engine from the gas pedal and establish an operative connection of the fuel supply control mechanism with the respective synchronization control device SYA1, SYA2. The control of the blocking device for the execution of this function is realized by a pulse whose duration corresponds to the duration of the idling condition in the existing correlated change gear G1, G2. It can be seen in FIGS. 4a, 4b that a pulse of the desired length can be obtained from the line 116 or line 124, respectively.

The mode of operation of the synchronization control devices SYA1, SYA2 and the blocking devices SP1 and SP2 in connection with the correlated fuel supply control mechanism will be explained with reference to FIGS. 5a, 5b and 8. It should be pointed out here that the synchronization control circuits according to FIGS. 4a and 4b are likewise connected to control lines, as shown in FIGS. 5a and 5b, but for reasons of clarity these control lines are omitted in FIGS. 4a and 4b.

The embodiment illustrated in FIGS. 5a and 5b differs from the above-described embodiment in that the triggering of the signals for the excitation of the gearshift motors GA1, GA2, which again are constituted by pressure medium-operated differential piston drives of the above-mentioned type, occurs in a different manner.

In FIG. 5a, the pulse transmitter 113 is followed by a holding circuit 139 whose holding time is so selected that the sum of the pulse duration of the pulse transmitter 113 and the holding time of the holding circuit 139 is at least equal to the longest possible duration of a shifting operation. The output signal of the holding circuit 139 then is transmitted to the gearshift motor GA1 via the input control line GAL1. The blocking device SP1 is actuated in the above-described manner via the lines or circuit components 115, 116, L1, 126 and 127.

However, the pulse for the excitation of the gearshift motor GA2 is not, as in the circuit illustrated in FIG. 4b, tapped directly from the output of the holding circuit 121 and supplied to the input control line GA12 by way of the lines 123, 124, 125, but is produced by a pulse transmitter 140 which is connected to the input control line GA12 and is activated from the actuating linkage 134 of the clutch K2 for producing a release pulse corresponding at least to the duration of a shifting operation, as soon as the pressure medium drive 133 is energized by the setting drive 132 due to a pulse 122 developing at the output of the holding circuit 121.

The actuation of the blocking device SP2 occurs precisely as above stated in connection with FIG. 4b through the lines 123 and 124, and after the attainment of the idling position in the change gear G2, via the line 12, valve 129, line 130, and again line 124.

The following is a description of the mode of operation of the synchronization control devices:

The function of these devices is to effect, dependent upon the particular condition of the correlated engine-transmission unit during idling of the respective change gear, an acceleration or deceleration of the engine shaft whereby synchronism of the transmission members to be coupled results. Accordingly, there is provided a control line 141 which leads to the synchronization control device SYA1, and which control line is connected to the output L1 of the indicating device A1 and which sets the synchronization control device SYA1 into operation as soon as the idling condition is reached in the change gear G1. The synchronization control device must be removed from operation whenever the synchronism of the transmission members to be coupled appears. Hence, the output of the comparing device V1 is connected via a disconnect line 142 with a corresponding disconnecting input of the synchronization control device SYA1. Lastly, also control lines 143 lead from the comparing device V1 to the synchronization control device SYA1, which are connected, for example, to complementary rest contacts, if the comparing device is defined by a differential relay provided with a contact bridged at equal excitation of the control windings, and which supply a command to the synchronization control device SYA1 for producing either an acceleration or a deceleration of the engine shaft. The synchronizing control devices SYA1, SYA2 of the circuits in FIGS. 4a, 4b and 5b, respectively, are designed and connected accordingly and therefore do not require further description.

Figure 6:
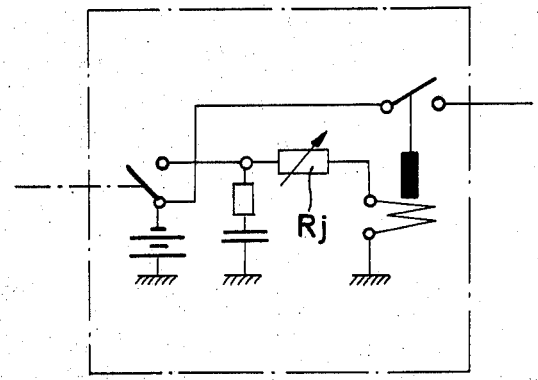
FIG. 6 is a diagrammatic view of a form of construction of a pulse transmitter illustrated in FIGS. 4a–4b, 5a and 5b.

A possible form of construction of the pulse transmitters 113, 140 in FIGS. 4 and 5 is shown in FIG. 6, with the adjustment of the pulse duration being possible by means of the adjusting resistor RJ.

Figure 7:
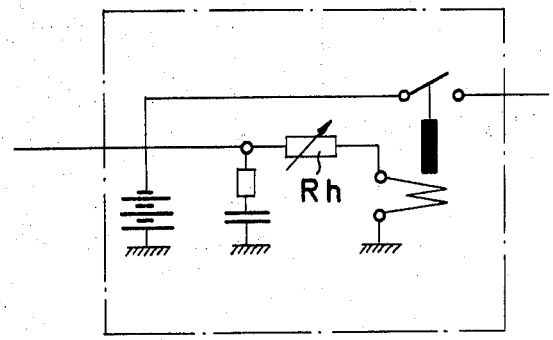
FIG. 7 is a diagrammatic view of a form of construction of the holding circuits indicated in FIGS. 4a, 4b, 5a, and 5b.

FIG. 7 illustrates a possible design of the holding circuits indicated in FIGS. 4 and 5 at 121, 128, 131 and 139, respectively, wherein the adjustment of the holding time is effected at the resistor Rh. Naturally, the pulse transmitters and holding circuits may alternatively be formed by corresponding electronic circuits familiar to one skilled in the art.

Figure 8:
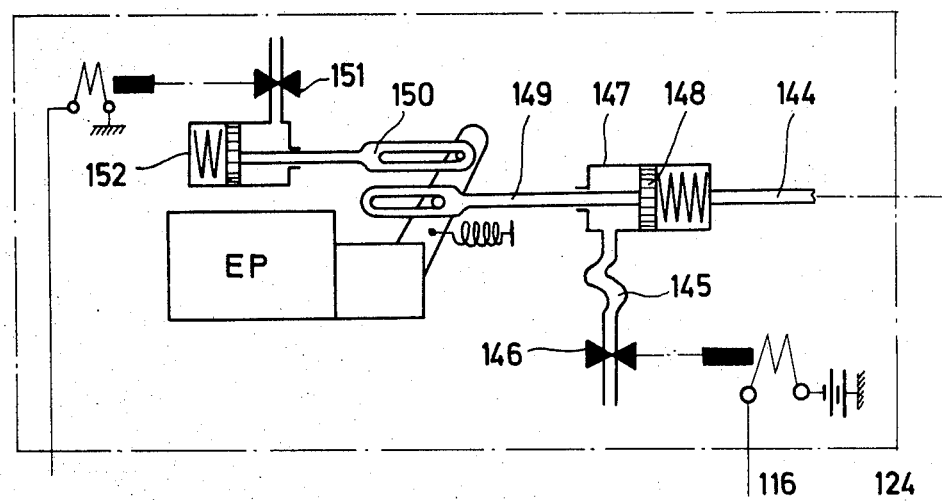
FIG. 8 is a schematic view of a fuel supply control mechanism associated with a driving engine, to explain the operation of the above-mentioned engine shaft accelerating and decelerating device as well as the correlated blocking device.

FIG. 8 shows diagrammatically a practical form of construction of the blocking in connection with the actuing linkage operated by the driver jointly for all engine-transmission units, the fuel supply control mechanism, and a part of the correlated synchronization control device. At 144 is indicated the end of the actuating linkage 135, 136 operated by the driver, and which holds a work cylinder 147 connected, via a flexible line 145 and a valve 146, to a pressure medium source. In the cylinder 147 there is movable, counter to a spring force, a piston 148 admitted with a pressure medium, with the piston holding an actuating fork 149. The fork 149 engages, at the actuating lever of the injection pump EP of the respective motor vehicle engine, as disclosed in FIG. 8. Further, there engages at this actuating lever, an additional actuating fork 150 which is connected with the piston of a pressure medium drive 152 loadable with a pressure medium via a valve 151.

If an electromagnetic drive serving to actuate the valve 146 remains unenergized, and which drive may be connected, for example, to the lines 116, 124, the spring of the cylinder 147 urges the piston 148 to the left (FIG. 8) so that the linkage train constituted by parts 144 and 149 has its greatest length, and an actuation of the gas pedal by the driver effects a corresponding displacement of the actuating lever of the injection pump EP, with the point of engagement of the actuating lever being moved back and forth relative to the actuating fork 150 within the latter. If blocking is to take place, the valve 146 is opened and the actuating fork 149 retracted so that the driver is no longer able to displace the correlated actuating lever of the injection pump. Then, the control of the injection pump passes to the pressure medium drive 152, a pressure medium admission and consequently an acceleration of the vehicle engine by opening of the valve 151 if the control line 143 has reported an operational condition which renders necessary an acceleration of the engine shaft for attaining synchronism of the transmission members to be coupled.

Figure 9:
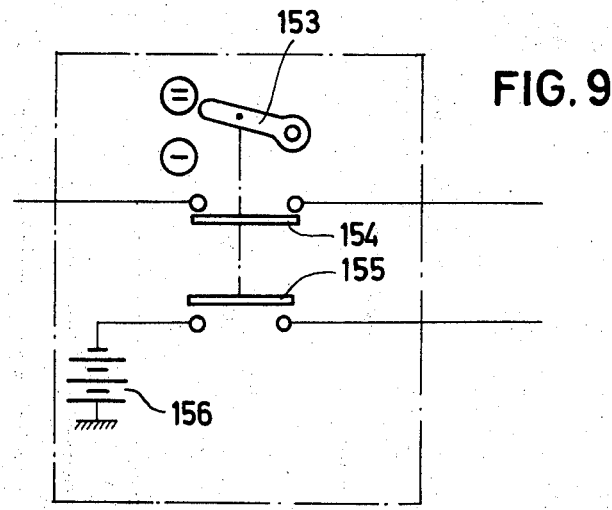
FIG. 9 is a diagrammatic view of a reversing switch for the changeover from operation with a two engine transmission unit to operate with a single engine transmission unit.

FIG. 9 shows a reversing switch which permits the changing over from the operation of the vehicle with both engine-transmission units to an operation with only one engine-transmission unit. The switch includes a contact set 154 to be actuated by means of a handle 153, and which contact set is also disclosed in FIG. 4b and lies in the train of the feed line of the comparing device V2. Further, the reversing switch is provided with a normally open contact set 155 connected to a voltage source 156 and the input line, respectively, leading to the short-time pulse transmitter 119. The contact set 155 and voltage source 156 are disclosed also in FIG. 4a. If the engine-transmission unit M2, G2 is to be disconnected, the switch shown in FIG. 9 is urged downwardly relative to the position illustrated and, due to which a pulse is sent to the short-time pulse transmitter 119, whereby a normal shifting operation of the engine-transmission unit M2, G2 of the above-described type develops for attaining the transmission idling position. However, since the comparing device V2 now is separated from the feed voltage, the change gear G2 remains in an idling position with the blocking being maintained until the switch shown in FIG. 9 is returned to the starting position.

In some situations it may be desirable to change over to a substantially simultaneous shifting of the engine-transmission units as customary until the present time. For this purpose, a reversing switch 157 operable by hand may be provided, and by means of which the input of the short-time pulse transmitter 119 is separable from the output E1 of the indicating device A1 and connectable with the output 114 of the pulse transmitter 113. Manifestly, by actuation of the clutch pedal 111, a substantially simultaneous actuation of the gearshift motors GA1 and GA2 is effected.

Figure 10:
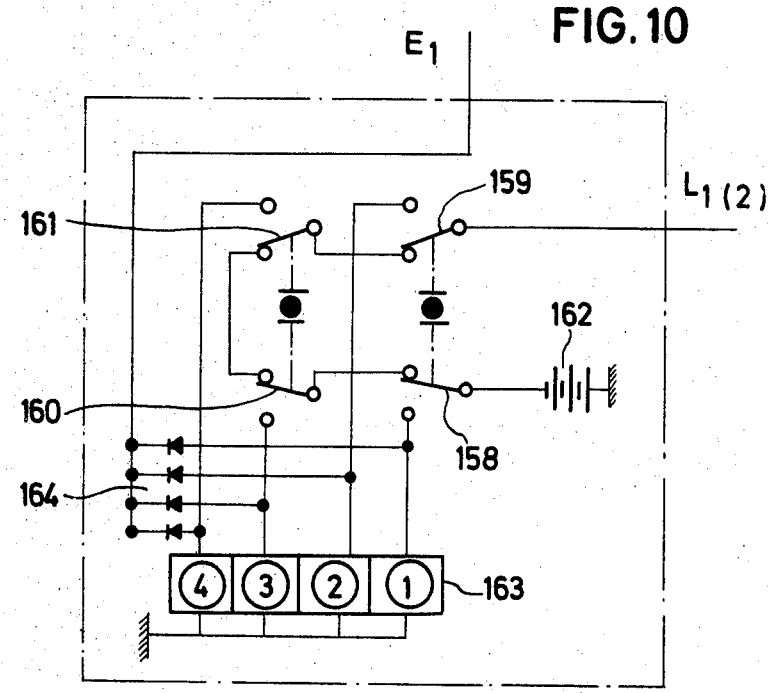
FIG. 10 is a diagrammatic view of an indicating device for the indication of the particular state of a variable-speed gear.

Further, in FIG. 10 there is disclosed an embodiment of the indicating device A1, A. The indicating device comprises a number of double-throw switches 158 to 161 corresponding to the number of selectable gears, and which switches are mechanically coupled with an actuating element of the gearshift motor or the change gear in such a manner that they are moved, upon engagement of the gear correlated therewith, into one switch position, and upon disengagement of this gear, into another switch position shown in FIG. 10 for all double-throw switches. When, therefore, the idling position of the respective change gear is reached, the switches 158 to 161 provide a series connection by which a voltage source 162 is connected with the output L1, 12 of the indicating device. When a certain gear is engaged, the switch associated therewith is thrown over, whereby a certain field of a gear indicator 163 is connected to the voltage source 162. Moreover, in the indicating device A1, and OR member constituted by rectifiers 164 connected in parallel and coupled with the output E1 is connected to the admission lines to the fields of the gear indicator 163. Consequently, the output E1 carries a signal voltage supplied from the voltage source 162 whenever one of the selectable gears is engaged.

Figure 11:
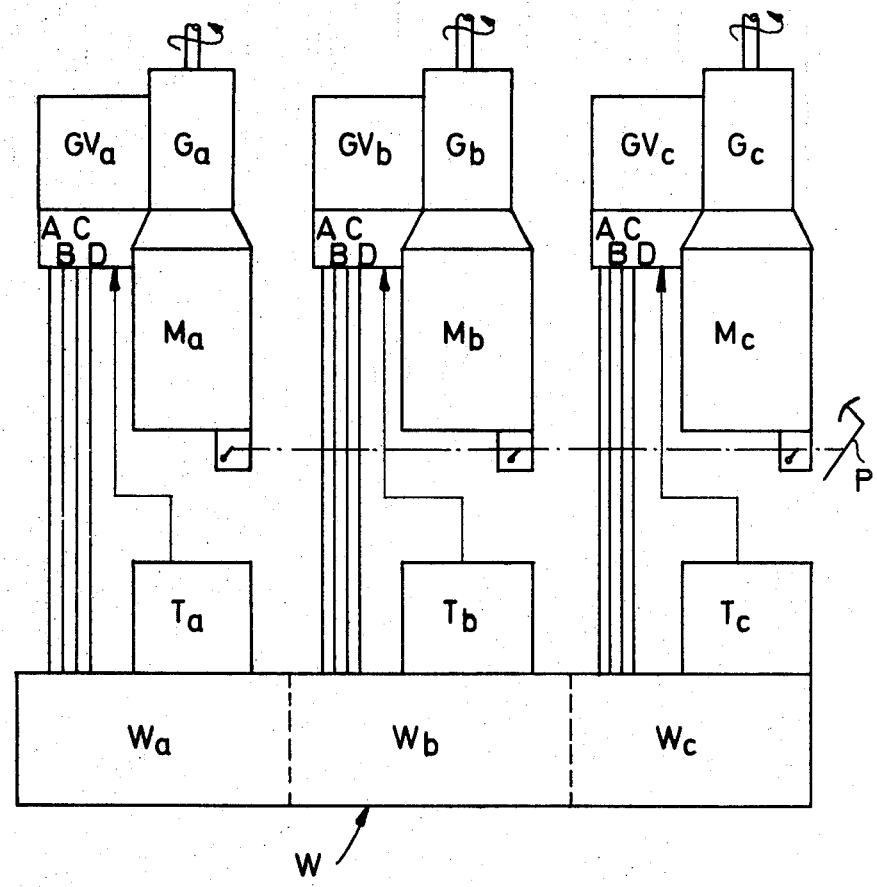
FIG. 11 is a diagrammatic view of the arrangement according to the invention to explain the principle common to the various forms of construction.

Lastly, reference is made to FIG. 11, which serves to explain the concept of the invention common to all forms of construction disclosed. In this figure is shown an embodiment in which three engine-transmission units are arranged on a motor vehicle and are coupled with a wheel group of the vehicle associated therewith but not illustrated in FIG. 11. The three engine-transmission units are denoted M$a$, G$a$; M$b$, G$b$; and M$c$, G$c$, respectively. The three engines M$a$, M$b$ and M$c$ are controllable by the driver with respect to the fuel supply by a gas pedal P. With each of the three engine-transmission units is associated a gearshift device GV$a$, GV$b$, GV$c$, each of which provides a number of control inputs corresponding to the number of engageable gears, and which control inputs are denoted A, B, C and D, assuming that four-gear transmissions are used. It is obvious to one skilled in the art that the invention is not limited to this number of selectable gears. A release device T$a$, T$b$, T$c$ and a common preparation means W cooperate with each of the gearshift devices and the means W includes the parts W$a$, W$b$ and W$c$ associated with the individual engine-transmission units.

While the release devices T$a$, T$b$ and T$c$ serve for producing release signals which are capable of energizing the correlated gearshift device for changing gear, the preparation means W determines to which of the control inputs A to D of the gearshift device GV$a$, GV$b$ and GV$c$ the control signals are supplied.

In order to avoid, in the manner described, how the flow of force between all engines of the motor vehicle and the correlated wheel groups is interrupted simultaneously, the correlated release devices T$a$, T$b$ and T$c$ are so adapted to each other in their mode of operation that the excitation of the mutually corresponding control inputs A to D of the individual gearshift devices GV$a$, GV$b$ and GV$c$ is staggered in time.

When, for example, the gearshift devices have been prepared for a certain change of gear in the manner described above by the preparation means W dependent upon a selective control by the driver or dependent upon an automatic control, the adaption of the release devices T$a$, T$b$ and T$c$ assures that the change of gear progresses in the entire arrangement in FIG. 11, for example, from left to right.

As has been set forth with reference to the examples described in detail above, the adaptation of the release devices may be effected either by independent adjustment or by a corresponding coupling of the release devices in such manner that the change of gear in a certain engine-transmission unit is performed only after the occurrence of an acknowledging signal that the change of gear in the preceding engine-transmission unit has been completed.

A person skilled in the art will find no difficulty in extending the circuits described in FIGS. 1 to 5 for use in vehicles with more than two engine-transmission units. It should be pointed out that with respect to FIGS. 4 and 5, the engine-transmission unit M2, G2 following the engine-transmission unit M1, G1 likewise embodies an indicating device which presents an output furnishing an output signal upon engagement of a gear in the respective change gear, and which output is not shown in the drawings and would be designated E2.

What I claim is:

1. Means for the electrical shifting of the change gears of a transmission for motor vehicles provided with wheels or wheel groups in which at least two identical engine transmission units are connected separately and the engines thereof are jointly controllable by the vehicle driver with respect to a fuel supply, the improvement comprising an excitable gearshift device operably related to each engine transmission unit, each gearshift device having a number of control inputs corresponding to the number of engageable gears, a release device for each gearshift device for producing a signal exciting the respective gearshift device to effect a change of gear, common preparation means operably connected between the release devices and the corresponding gearshift devices for determining to which of the control inputs of the gearshift device the control signals are supplied, and the release devices associated with the engine transmission units being so related to each other in their mode of operation that the excitation of mutually corresponding control inputs of the gearshift devices occurs in a staggered time relationship.

2. Means for the electrical shifting of automatically controlled change gear with respect to the particular gear selection of a transmission for motor vehicles provided with wheels or wheel groups in which at least two identical engine transmission units are connected separately, and the engines thereof are jointly controllable by the vehicle driver with respect to a fuel supply, the improvement comprising an excitable gearshift device operably related to each engine transmission unit, each gearshift device having a number of control inputs corresponding to the number of engageable gears, a release device for each gearshift device for producing a signal exciting the respective gearshift device to effect a change of gear, common preparation means operably connected between the release devices and the corresponding gearshift devices for determining to which of the control inputs of the gearshift device the control signals are supplied, the release devices associated with the engine transmission units being so related to each other in their mode of operation that the excitation of mutually corresponding control inputs of the gearshift devices occurs in a staggered time relationship, said preparation means including a part correlated to each of the engine transmission units, a synchro coupled with each engine shaft for effecting at its output a voltage proportional to engine speed, a synchro connected to each changeover gear for producing a voltage proportional to the speed of rotation of the output shaft of the transmission, said part and one corresponding release device for each constituting a signal transmitter related operably to the respective engine transmission unit for picking up electric voltages produced by the synchros and proportional, on the one hand, to the vehicle speed and, on the other hand, to the particular engine speed, and an appertaining linkage circuit by means of which there is produced a gearshift control signal corresponding to a certain engine speed and to a certain vehicle speed, with said latter signals being supplied to a corresponding control input of the particular gearshift device, and adjusting elements of the linkage circuit of one of the signal transmitters being such in relation to corresponding adjusting elements of the linkage circuit or circuits of the other signal transmitter or transmitters that different value pairs of the particular engine speed and of the vehicle speed respectively, are correlated to mutually corresponding gearshift control signals of the signal transmitters for releasing the shifting of corresponding gears at the respective transmissions.

3. The shifting means as claimed in claim 2, which for the production of a voltage proportional to the vehicle speed, there is provided a synchro common to the signal transmitters and coupled with the output shaft of one of the two transmissions.

4. The shifting means as claimed in claim 2 in which each of the signal transmitters comprises a feeler switching circuit connected to the appertaining synchro of the respective engine and having three stable states, the first state corresponding to an engine speed below an optimum operational range of the engine, the second state to an engine speed above the operational range of the engine, a distributor circuit, and upon occurrence of the first and third states, lines carrying a signal voltage are connectable, via said distributor circuit, dependent with respect to its switch state on the vehicle speed, to a specific one of the control inputs of the particular gearshift device.

5. The shifting means as claimed in claim 4 in which the feeler switching circuit includes a storage device for permitting a transposition of the switching circuit from one state to the other only after the corresponding new operational state of the engine has been in operation for some time and/or differs essentially from the previous operational state.

6. The shifting means as claimed in claim 5 in which the synchro voltage corresponding to the engine speed is a direct current voltage, and said storage device is defined by a condenser connected in parallel with the exciter winding of a relay energized by the direct current voltage and occupying a middle position at a certain exciter current, with the contacts of the relay connecting a current source during said first state of the feeler circuit with one signal line and with another signal line during the third state.

7. The shifting means as claimed in claim 6, in which the train of said signal lines is provided with holding circuits constituted by holding relays with delayed tripping time.

8. The shifting means as claimed in claim 4, in which the distributor circuit of the linkage circuit is defined by a relay chain, the relays of which are adjusted with respect to their response or tripping to synchro voltages corresponding to certain vehicle speeds, with each control input of the gearshift device being connected, on the one hand, with the line carrying signal voltage during the third state of the feeler circuit via a relay contact of a relay of the relay chain correlated to this input and, with respect to inputs correlated to higher than the lowest gear, via the after connected series connection of the relay contacts complementary thereto of the relays of a lower order, and, on the other hand, with the line carrying signal voltage during the first state of the feeler circuit via a relay contact of the relay chain correlated to this input, and with respect to inputs correlated to lower than the highest gear, via the after connected series connection of relays of higher order complementary to this relay contact.

9. The shifting means as claimed in claim 4 in which the distributor circuit of the linkage circuit is defined by a relay chain, the relays of which are adjusted with respect to their response or tripping to synchro voltages corresponding to certain vehicle speeds, with each input of the gearshift device being connected, on the one hand, with the line carrying a signal voltage during the third state of the feeler circuit via a relay contact of a relay of the relay chain correlated to this input, and, with respect to inputs correlated to higher than the lower gear, via the after connected series connection of the relay contacts complementary thereto of the relays of lower order, and, on the other hand, with the line carrying a signal voltage during the first state of the feeler circuit via a relay contact of a relay correlated to the next higher gear as well as via the after connected series connection of the relay contacts complementary thereto of higher order than the last named relay, in such manner that a signal voltage corresponding to the first state of the feeler circuit is transmitted to certain of the outputs of the relay chain.

10. The shifting means as claimed in claim 4 in which the distributor circuit of the linkage circuit is constituted by a flip-flop chain.

11. The shifting means as claimed in claim 10, in which the linknage of the output signals of the flip-flop chain is so selected that, when shifting from higher to lower gears, one gear is skipped.

12. The shifting means as claimed in claim 2, including a comparator circuit, each gearshift device having therewith a synchronization circuit which, by means of said comparator circuit supplies, upon synchronism of the transmission members to be coupled together, a synchronism reporting signal, which is combined in an AND circuit member connected with a corresponding control input of the particular gearshift device with a gearshift control signal.

13. The shifting means as claimed in claim 12, in which the comparator circuit includes a polarized differential relay having a central contact with one control winding thereof being connectable to the particular engine synchro and the other control winding thereof being connectable, while controlling the linkage circuit as a function of the particular vehicle speed, across resistances rated according to the particular transmission ratio of the gears to be shifted, to the synchro associated with the vehicle speed.

14. The shifting means as claimed in claim 13, in which the AND circuit members of the comparator circuit are defined by relays energized by the gearshift control signals of the linkage circuit, which relays comprise a contact set through which the resistances corresponding to the transmission ratio of the gears to be shifted are insertable into one control circuit of the differential relay, and which include an additional contact set, over which the synchronism reporting signal of the differential relay can be supplied to the correlated control input of the gearshift device.

15. The shifting means as claimed in claim 14, in which, an OR circuit member is disposed between the signal lines carrying a signal voltage in the first and third states of the feeler circuit for producing, on the one hand, the loading with voltage of the comparator circuit, and on the other hand, the preparing of the gearshift device for engagement of the next gear by disengagement of the previously engaged gear.

16. The shifting means as claimed in claim 1 for motor vehicles provided with a manual gearshift, in which a driver-actuated gear selector defines the preparation means and jointly governs the engine transmission units, synchronizing and shifting devices preparable for the execution of the particular change of gear by the gear selector, releasable successively by command pulses, and constituting the gearshift devices, a driver-actuated pulse transmitter related to the correlated triggering device for supplying pulses to effect the change of gear in a corresponding preceding engine transmission unit, with one synchronizing and shifting device serving as a guide unit being connected with said driver-actuated pulse transmitter, while the other synchronizing and shifting devices active in a certain sequence as subsequent units likewise define pulse transmitters related to corresponding release devices for furnishing command pulses for a time staggered execution of the change of gear in the engine transmission units following said preceding engine transmission unit and following each other, whenever the same have received from an indicating device correlated to the preceding engine transmission unit via release lines a release signal reporting the completion of the desired change of gear in the preceding engine transmission unit.

17. The shifting means as claimed in claim 16, in which the individual synchronizing and shifting devices comprise a comparing device, to which electric measurable variables produced by means of synchros are supplied and which represent the transmission input speed or the transmission output speed respectively and transmitted via series elements corresponding to the selectable transmission ratios of the gear and addable by the gear selector, comprising a gearshift motor connected with the comparing device, with the gearshift motor being actuated by the output signal, occurring upon the synchronism of the transmission members to be coupled, of the comparing device for engaging the selected gear, and an engine shaft accelerating or decelerating device which, prior to engagement of the respective gear, establishes synchronism of the transmission members to be coupled, and the individual engine transmission units have associated therewith blocking devices connected via control lines with the correlated pulse transmitters and which, for the duration of the idling adjustments of the respective transmissions, effect the separation of fuel supply control mechanisms of the respective engines from a gas pedal and establish an operative connection of the respective fuel supply control mechanism with the respective engine shaft accelerating or decelerating devices.

18. The shifting means as claimed in claim 17, in which the individual control lines serving for release between the pulse transmitters and the correlated blocking devices are connected via lines including a valve to outputs of the indicating devices of the respective engine transmission units for furnishing a signal voltage for the duration of the idling position of the respective transmissions.

19. The shifting means as claimed in claim 17 in which the individual gearshift motors are defined by pressure medium-operated differential piston drives which, upon connection with a pressure medium source, first establish the transmission idling position and upon subsequent selective venting of individual piston sides engage the selected gear, said individual gearshift motors comprising an input control line for energizing a setting drive which, upon being energized, clears the connection of the pressure medium source with the differential piston drive, and the outputs of the respective comparing devices being connectable by gear selectors selectively with setting drives for the actuation of venting valves related to the particular piston sides.

20. The shifting means as claimed in claim 19, in which the pulse transmitter correlated to the preceding engine transmission unit is defined by a relay having a holding circuit energizable by means of a driver-actuated switch through which the input control lines of the respective gearshift motor is connectable with a voltage source.

21. The shifting means as claimed in claim 19 in which the pulse transmitters correlated to the following engine transmission units comprise a relay having a holding circuit through which the input control line of the respective gearshift motor is connectable with a voltage source and said relay being energized by a short-time pulse transmitter to which in turn, the release signal supplied by the indicating device correlated with the preceding engine transmission unit can be supplied via the respective release line.

22. The shifting means as claimed in claim 20, in which a holding circuit is arranged in the train of the respective input control line which, after the disappearance of the signal voltage occurring at the output of the correlated indicating device, maintains the energized condition of the input control line for a short time.

23. The shifting means as claimed in claim 19, in which the pulse transmitter associated with the preceding engine transmission unit serves to release a holding circuit through which the input control line is connectable with a voltage source, the sum of the pulse duration of said pulse transmitter and the holding time of said holding circuit being at least equal to the duration of the respective gearshift operation, and the respective input control lines of the gearshift motors correlated to the following engine transmission units being energizable via holding circuits whose holding times correspond to the duration of the respective gearshifting operations and which are energized as a function of the actuation of the pulse transmitters correlated to the respective engine transmission units.

24. The shifting means as claimed in claim 17 in which the release of the pulse transmitter associated with the preceding engine transmission unit is effected by a switch operable from a driver-actuated clutch pedal simultaneously with a brief release of a clutch of the engine transmission units thereby causing the release of setting drives serving for the clutch operation of the respective engine transmission units.

25. The shifting means as claimed in claim 16 including a number of reversing switches having a make-and-break contact, the studs of which are connected to the release lines leading to the pulse transmitters correlated to the following engine transmission units, and one of the contacts being connected to the output of the respective indicating device supplying the release signal, with the other of the contacts being connected with the output of the pulse transmitter associated with the respective engine transmission unit.

26. The shifting means as claimed in claim 17 for vehicles provided with two engine transmission units, including a selector switch for switching from operation with two engine transmission units to operation with a single engine transmission unit, said selector switch having a contact set interrupting the energy supply to the comparing device associated with the other engine transmission unit and another contact set connecting a voltage source to the release line leading to the pulse transmitter of said other engine transmission unit.

27. The shifting means as claimed in claim 16 in which the indicating devices are defined by a number of switches having a make-and-break contact corresponding to the number of selectable gears, said switches being mechanically coupled with the change gears to be shifted and wired so that during the transmission idling positions, a voltage source connected via the series connection of a contact pair of said switches to an output providing a release signal, while upon engagement of a gear, a signal device is energized via the other contact pair of the switches related to this gear, and all inputs of these signal devices being connected via an OR circuit member to the or one output respectively of the indicating devices providing an output signal upon the engagement of a gear.

28. The shifting means as claimed in claim 17 in which fuel supply control mechanisms of the individual engines are connected via a linkage provided with an actuating fork with the driver-actuated gas pedal, the respective blocking devices being defined by pressure medium drives for varying the effective length of said linkages counter to a spring force and energizable via the control lines, and the respective engine shaft accelerating or decelerating devices comprising pressure medium drives operable on the respective fuel supply control mechanisms and controlled by establishing synchronism of the transmission members to be coupled.

References Cited
UNITED STATES PATENTS

| | | | |
|---|---|---|---|
| 2,419,912 | 4/1947 | Ormsby | 180—54.1 |
| 2,427,863 | 9/1947 | Lauver et al. | 180—54.1 |
| 2,726,360 | 12/1955 | Storsand | 74—847X |
| 3,027,962 | 4/1962 | Wolf | 180—77 |
| 3,090,458 | 5/1963 | Wolf | 74—847X |
| 3,417,640 | 12/1968 | Schmidt et al. | 74—866 |
| 3,446,097 | 5/1969 | Schmidt et al. | 74—866X |

ARTHUR T. McKEON, Primary Examiner

U.S. Cl. X.R.

74—334 (Died), 866; 192—0.92